(12) United States Patent
Li

(10) Patent No.: US 9,792,300 B2
(45) Date of Patent: *Oct. 17, 2017

(54) SYSTEMS AND METHODS FOR PRESENTING LOCATION RELATED INFORMATION

(71) Applicant: Chian Chiu Li, Fremont, CA (US)

(72) Inventor: Chian Chiu Li, Fremont, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/397,726

(22) Filed: Jan. 3, 2017

(65) Prior Publication Data

US 2017/0116223 A1    Apr. 27, 2017

Related U.S. Application Data

(63) Continuation-in-part of application No. 14/525,194, filed on Oct. 27, 2014, now Pat. No. 9,619,022.

(51) Int. Cl.
| | |
|---|---|
| G06F 17/30 | (2006.01) |
| G06F 3/01 | (2006.01) |
| G06F 3/16 | (2006.01) |
| G06F 3/0346 | (2013.01) |
| G06F 1/16 | (2006.01) |
| G06Q 30/02 | (2012.01) |

(52) U.S. Cl.
CPC ...... *G06F 17/30241* (2013.01); *G06F 1/1694* (2013.01); *G06F 3/013* (2013.01); *G06F 3/0346* (2013.01); *G06F 3/167* (2013.01); *G06Q 30/0267* (2013.01); *G06Q 30/0269* (2013.01)

(58) Field of Classification Search
CPC .. G06F 17/30241; G06F 1/1694; G06F 3/013; G06F 3/0346; G06F 3/167; G06C 30/0267; G06C 30/0269

USPC .......................................................... 345/156
See application file for complete search history.

(56) References Cited

U.S. PATENT DOCUMENTS

| | | | | |
|---|---|---|---|---|
| 9,619,022 | B2* | 4/2017 | Li ........................... | G06F 3/013 |
| 2005/0228719 | A1* | 10/2005 | Roberts .................. | G06Q 30/02 |
| | | | | 705/14.58 |
| 2007/0184844 | A1* | 8/2007 | Jamshidi ................ | G06Q 30/08 |
| | | | | 455/456.1 |
| 2008/0214150 | A1* | 9/2008 | Ramer .............. | G06F 17/30749 |
| | | | | 455/414.1 |
| 2009/0143077 | A1* | 6/2009 | Jamshidi ................ | G06Q 30/02 |
| | | | | 455/456.1 |
| 2011/0084951 | A1* | 4/2011 | Karhuketo ............ | G06F 1/3203 |
| | | | | 345/211 |
| 2012/0293546 | A1* | 11/2012 | Lahcanski ............. | G06T 19/006 |
| | | | | 345/633 |
| 2013/0050080 | A1* | 2/2013 | Dahl ........................ | G01S 5/18 |
| | | | | 345/158 |
| 2013/0326495 | A1* | 12/2013 | Reunamaki ............... | G06F 8/65 |
| | | | | 717/173 |
| 2014/0171043 | A1* | 6/2014 | Gotzl ...................... | H04L 67/06 |
| | | | | 455/414.2 |
| 2016/0116978 | A1* | 4/2016 | Li .......................... | G06F 3/013 |
| | | | | 345/156 |

\* cited by examiner

*Primary Examiner* — Tony Davis

(57) ABSTRACT

Systems and methods for presenting location related information after a user arrives at a place. In an aspect, when a user gazes at a display of a standby device, information presentation begins. In another aspect, when a user shakes a standby device and then gazes at it, a presentation starts. Location related info may be sorted and presented by the pointing direction of a device.

20 Claims, 3 Drawing Sheets

SYSTEMS AND METHODS FOR PRESENTING LOCATION RELATED INFORMATION

CROSS REFERENCE TO RELATED APPLICATION

This is a continuation-in-part of Ser. No. 14/525,194, filed Oct. 27, 2014, now U.S. Pat. No. 9,619,022, granted Apr. 11, 2017.

FEDERALLY SPONSORED RESEARCH

Not applicable

SEQUENCE LISTING OR PROGRAM

Not applicable

BACKGROUND

Field of Invention

This invention relates to presenting information, more particularly to presenting location related information utilizing gaze detection.

Description of Prior Art

Many portable electronic devices have become ubiquitous, as an indispensible part of our daily life. Examples include smartphones, tablet computers, and potentially, smart watches or other wearable gadgets. These devices, especially smartphones, may be used to transmit to users and then present information such as advertisement prepared for consumers, notice and info for event attendees, class messages for students, or flight info for passengers. But many a time, it is not easy to acquire contact info of people involved and to figure out when to present. For instance, most ads are delivered to people indiscriminately, blindly, and without specific consideration on timing, which compromises the effectiveness of ads.

To make ads more relevant and acceptable, location-based advertising has been advocated. For instance, people visiting a store have a better chance to become a customer than people elsewhere. So a store manager may be more interested in sending ads to people present at the store than people at home. The same is true for delivery of information other than advertisements. For example, event attendees are more willing to read event material when they are in there, students are more likely to read class messages when at school, and passengers are more eager to learn flight and gate status when at the airport. Moreover, it's relatively straightforward to send location related information, since devices on the scene are the obvious target, and it may start sending messages right after users arrive at a location or come near a location. As a result, it's likely that the right info is sent to the right people in the right place at the right time. But then, the next issue may be how to present it in such a way that it is easy, simple, and convenient for a user to access. If relevant info is transmitted via email, a method used quite often nowadays, people may have to go through several steps to log in an email account, open a mail, and then take a look at it. If viewing info requires an app, people have to find the app among other apps installed at a device and then launch it. Either way, it is not convenient enough to look for info transmitted from a network or service to a device. On the other hand, if a device is on, and info content pops up by itself, it may become annoying; and if a device is in standby mode with a dark screen, it is inappropriate to lighten up its display to show any content without user consent. Thus presenting info on a device automatically has its own limitations.

Therefore, there exists a need to present location related information in a simple, easy, and convenient way.

OBJECTS AND ADVANTAGES

Accordingly, several main objects and advantages of the present invention are:

a). to provide improved methods and systems to present location related information;
b). to provide such methods and systems which start a presentation when a user gazes at it;
c). to provide such methods and systems which start a presentation when a user shakes it and then gazes at it, with more user control;
d). to provide such methods and systems which sort location related information by device pointing direction; and
e). to provide such methods and systems which make info access easy, simple, and convenient.

Further objects and advantages will become apparent from a consideration of the drawings and ensuing description.

SUMMARY

In accordance with the present invention, methods and systems are proposed to present location related information. After a user arrives at a place, the user may just look at a device screen to start info presentation by gaze. The user may also shake a device first to trigger gaze detection, and then watch it to bring out a presentation by gaze. The method makes it easy and convenient for users to view location related information. Moreover, location related information may be sorted and presented by device pointing direction for simplified presentation and easy understanding.

DRAWING FIGURES

Figure 4:
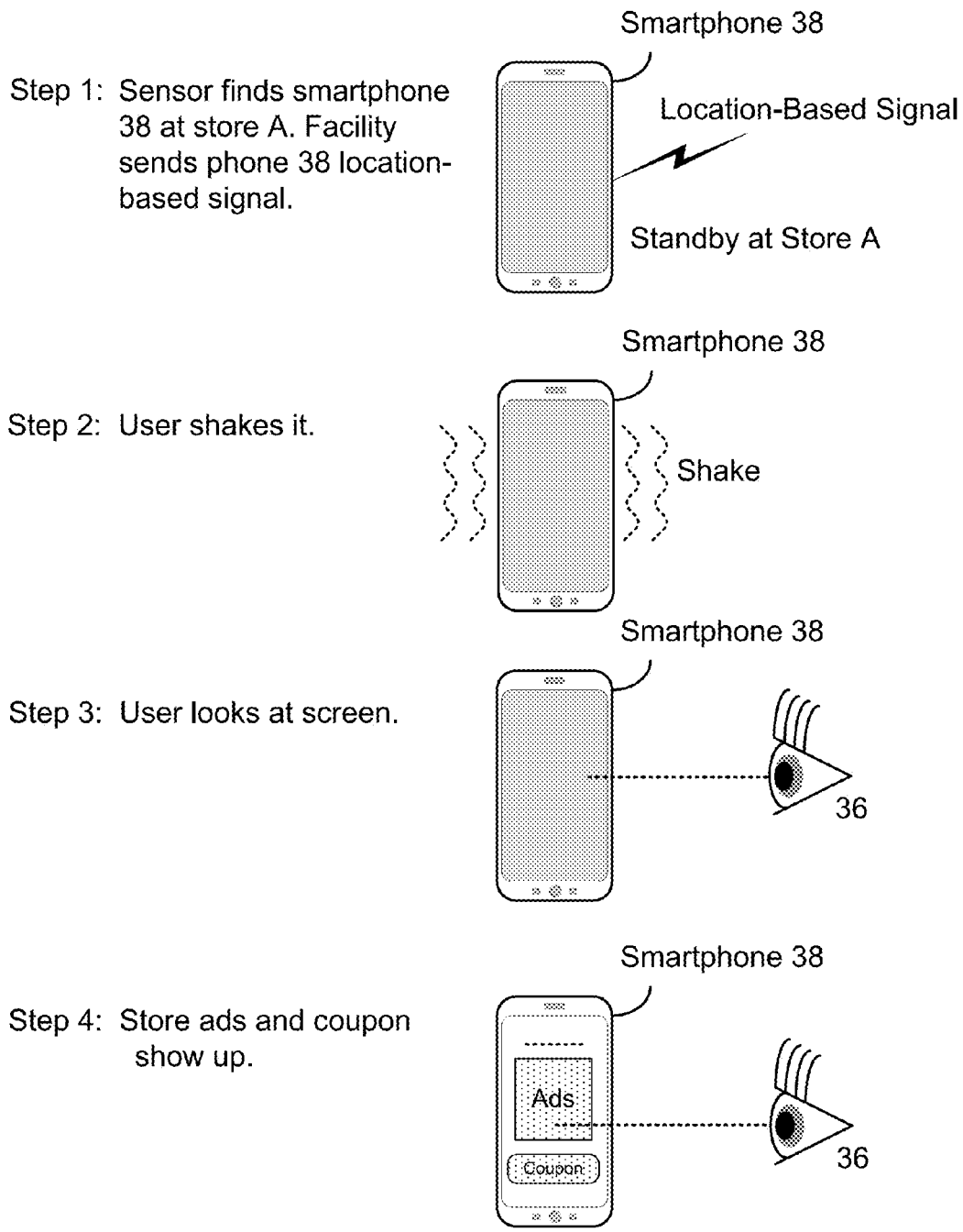

FIG. 4 uses graphic diagrams to show yet another embodiment of information presentation in accordance with the present invention.

| REFERENCE NUMERALS IN DRAWINGS | | | |
|---|---|---|---|
| 10 | Sensor | 12 | Device |
| 14 | Processor | 16 | Computer Readable Medium |
| 18 | Sensor | 20 | Sensor |
| 22 | Sensor | 36 | Eye |
| 38 | Smartphone | | |
| 100, 102, 104, 106, 108, 110, 112, 114, 116, 118, 120, 122, 124, and 126 are exemplary steps. | | | |

DETAILED DESCRIPTION

Figure 1:
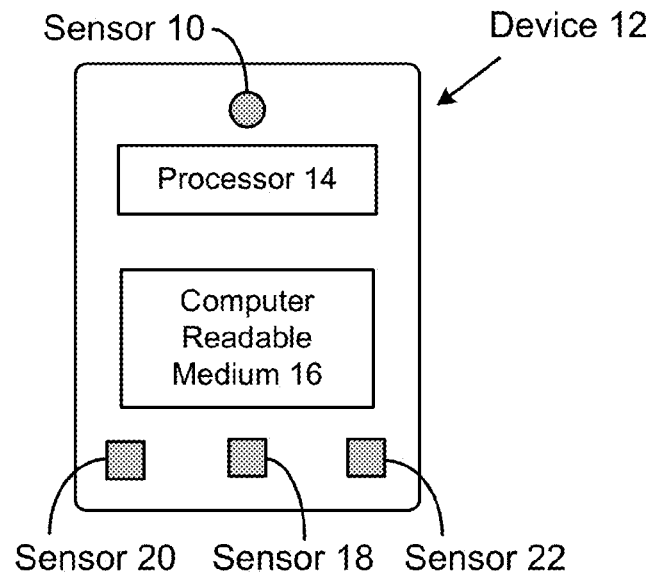
FIG. 1 is an exemplary block diagram describing one embodiment in accordance with the present invention.

FIG. 1 is an illustrative block diagram of one embodiment according to the present invention. A device 12 may represent an electronic device, including but not limited to mobile phone, smart phone, smart watch, wearable device, handheld computer, tablet computer, and the like. Device 12 may include a processor 14 and computer readable medium 16. Processor 14 may mean one or more processor chips or systems. Medium 16 may include a memory hierarchy built by one or more memory chips or storage modules like RAM, ROM, FLASH, magnetic, optical and/or thermal storage devices. Processor 14 may run programs or sets of executable instructions stored in medium 16 for performing various functions and tasks, e.g., surfing on the Internet, playing video or music, gaming, electronic payment, social networking, sending and receiving emails, messages, files, and data, executing other applications, etc. Device 12 may also include input, output, and communication components, which may be individual modules or integrated with processor 14. The communication components may connect the device to another device or a communication network. Usually, Device 12 may have a display (not shown in FIG. 1 for brevity reason) and a graphical user interface (GUI). A display may have liquid crystal display (LCD) screen, organic light emitting diode (OLED) screen (including active matrix OLED (AMOLED) screen), or LED screen. A screen surface may be sensitive to touches, i.e., sensitive to haptic and/or tactile contact with a user, especially in the case of smart phone, smart watch, and tablet computer. A touch screen may be used as a convenient tool for user to enter input and interact with a system. Furthermore, device 12 may also have a voice recognition component for receiving verbal command or audio input from a user.

A communication network which device 12 may be connected to may cover a range of entities such as the Internet or the World Wide Web, a local area network (LAN), a wide area network (WAN), a metropolitan area network (MAN), a telephone network, an intranet, wireless, and other types of networks. Device 12 may be connected to a network by various wired, wireless, optical, infrared, ultrasonic or other communication means.

Device 12 may also include a sensor 10 which tracks the eye movement or gazing direction of user using mature eye-tracking or gaze detection technologies. The sensor may be arranged on the top surface of device, or close to a display screen, and may be designed to have imaging capability. With imaging functions, a system may recognize whether users' eye is in such a position that the eye sight falls on the body of device 12 using certain algorithm, in other words, sensor 10 may be employed to determine whether a user is looking at the body or the screen of a device. Once it senses that a user is gazing or looking at a given target, it may record the starting time, and then the total gazing or watching time. Only when the gazing or watching time exceeds certain value, for instance a few seconds, it may be declared that a user is gazing or looking at a target. As a consequence, a very brief look may be too short to qualify as a gazing or watching act. In the following sections, it is assumed the total gazing time of each case satisfies a minimum value requirement when it is said a gazing act is detected.

Sensor 10 may be built using mature imaging technologies, such as camera modules used in almost every smartphone, and an image of user's eye may be analyzed with mature algorithm to decide which direction a user is looking at. Both visible and infrared light may be employed for eye tracking. In the latter case, an infrared light source may be arranged to provide a probing beam. In addition, sensor 10 may also employ other suitable technologies which are capable and affordable other than the eye-analysis scheme discussed to determine a gazing or watching direction of a user. In some applications, when the accuracy of gazing direction is not critical, such as when a gaze target is a screen, not a small area of the screen, a watching direction may be obtained via analyzing facial pictures of a user.

Device 12 may also include a sensor 20 which functions as a proximity detector, which is well known in the art and well developed too. Sensor 20 may be used to detector an object outside of the device and may have multiple sensing units. It may include a camera-like system to obtain visible images or infrared images and then recognize any movement through image analysis over a period of time. It may also have capability to sense whether device 12 is close to a user's body or whether it is held by a hand. Detection result may be used to determine an environment where a user is in, or the intention of a user. For instance, a user may want to look at a device anytime when he is holding it on hand.

Moreover, device 12 may contain a sensor 18 to detect its own movement by sensing acceleration, deceleration, and rotation, which may be measured by accelerometers and gyroscopes. Accelerometers and gyroscopes are already mass produced using semiconductor technologies. They are widely used in smartphones and other personal gadgets. Using measurement data obtained by sensor 18, it can be determined whether device 12 is moved to the left, right, forward, or backward, and at what speed, whether it is rotated clockwise or anticlockwise along which axis, and whether it is tilted to the left, right, forward, or backward. The data may also be used to detect whether a device is moved back and forth as a result of shaking. In some embodiments in the following, device shaking, as a user input, is one state to be detected. Word "shake" or "shaking" may be interpreted here as moving a device horizontally or vertically, rotating along any axis, or any other patterns of back and forth movement. Furthermore, sensor 18 may be used to detect vibration of device 12. Thus, knocking or tapping on a device body may be utilized as a user input too, because it generates detectable vibration signals.

Inside device 12, output signals of sensors and detectors are transmitted to processor 14, which, employed with certain algorithm, may process the data and produce subsequent command instructions according to certain programs or applications. The instructions may include presenting location related info on a screen.

In addition, device 12 may carry a positioning sensor (not shown in FIG. 1 for brevity) and a magnetic sensor 22 as an electronic compass. A positioning sensor may be a global positioning system (GPS), which enables a device to get its own location info. Device position may also be obtained using wireless triangulation methods, or a system using other suitable technologies, while both may be performed by a service provider or service facility. Sensor 22 measures the earth magnetic field along at least two orthogonal axes X and Y. It may be used to determine device orientation, such as which direction a device is pointing at, assuming the device is placed in a horizontal or vertical position. When a device's location is known, service center may send to the device location-based information, i.e., info related to the location or nearby places. In the case of location-based advertising, a user may receive commercials after he or she is at a business or close to a business. On the other hand, when the pointing direction of device is known, space around a user may be divided into sections. With the knowledge of device's location and pointing direction, a segment of map area which corresponds to where a device is pointing at may be generated. The segment may match user's interest, and thus information from this segment may be more relevant than info from other areas. Meanwhile, sorting by segment may make information easier to view for users, since contents presented on screen are reduced.

Figure 2:
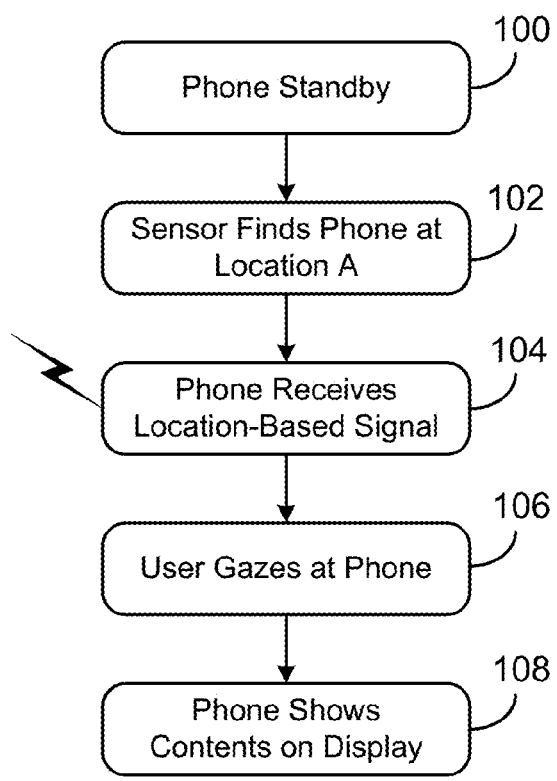
FIG. 2 is an exemplary flow diagram showing one embodiment of presenting location related information in accordance with the present invention.

FIG. 2 is a schematic flow diagram showing one embodiment of presenting location related information. Take smartphone for example. Assume a smartphone is in standby mode in Step 100. When a user with the phone enters Location A, a system sensor may detect it in Step 102. For instance, when a phone arrives at a place, a service provider may sense it or a local sensor may detect it using mature positioning technologies. Assume there is information available which is related to Location A. In Step 104, a location-based signal is transmitted to the phone and the phone receives it. The signal may come from a remote center or a nearby facility. Once the phone gets the signal, it starts sensing user's gaze direction. When not triggered, gaze detection function may be in off state to conserve power. In Step 106, the user gazes at the phone screen, which may be sensed by a gaze sensor like sensor 10 of FIG. 1. Here user's gaze act may work as user's approval for presenting information. In Step 108, the phone displays contents related to Location A.

After arriving at a location, a user may become more likely to view information related to the place. The user just needs to look at phone screen, info would appear automatically. The info presentation process is easy, simple and convenient. It may be used by teacher to distribute class notes, which may be accessed by students at one classroom only, by store manager to send advertisement to people at or close to his or her store only, or by organizer to send on-site event participants info on the event. Usually for indoor or some urban environment, positioning methods other than GPS are used, since GPS requires a clear view of the sky or clear line of sight for four GPS satellites.

The scheme described in FIG. 2 provides a simple and practical way to arrange location related information. But when lot of such information is available, it makes things a little complicated. For instance, in a shopping mall area, there may be many stores and shops around. As a consequence, a user may find it time consuming to get needed info. Thus a quick and convenient sorting method is desirable. For this issue, following discussion gives a solution.

Figure 3:
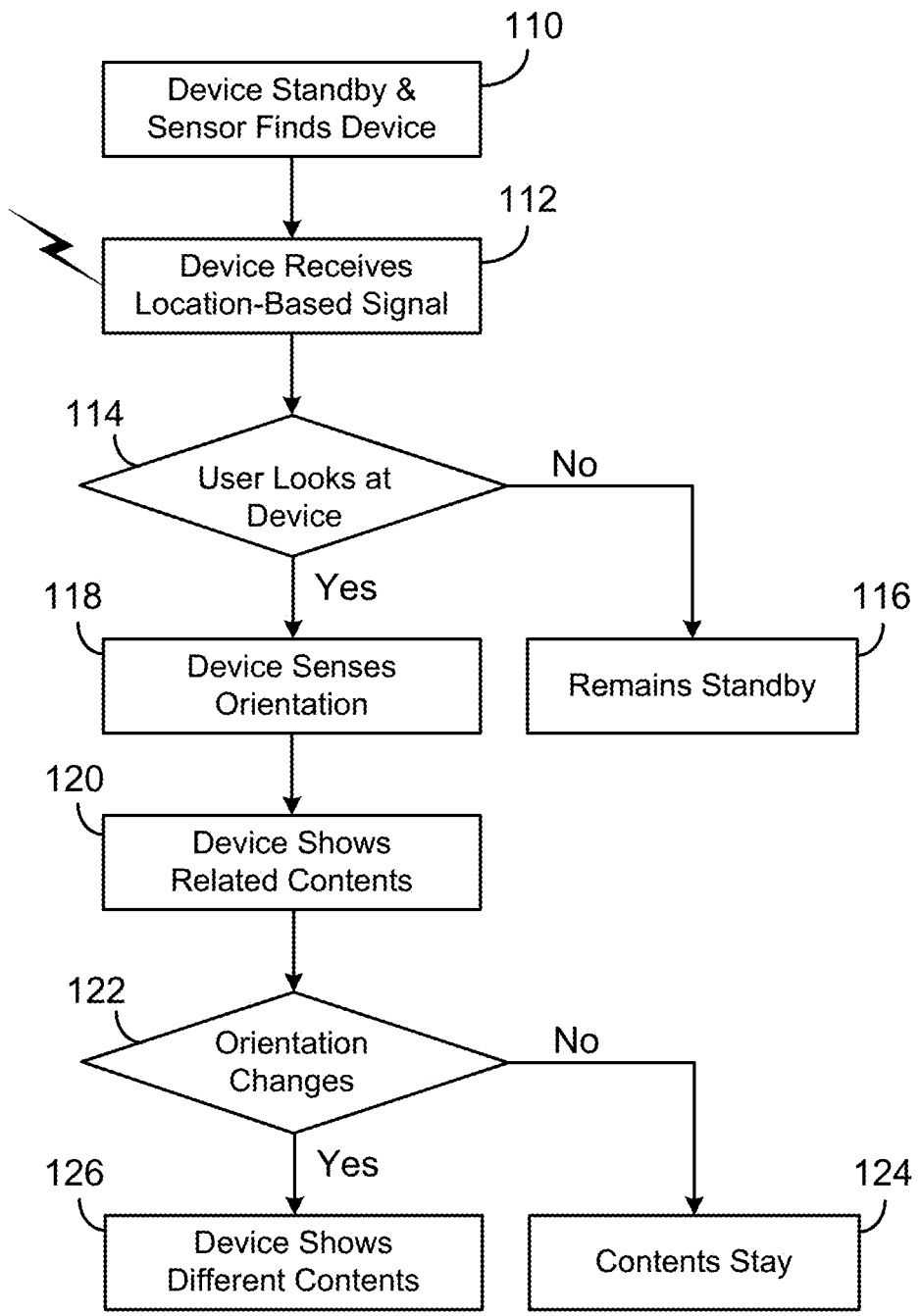
FIG. 3 is an exemplary flow diagram showing another embodiment of presenting location-based information in accordance with the present invention.

FIG. 3 shows another schematic flow diagram of presenting location related information. Assume a device is standby and is detected at a place in Step 110. Next in Step 112, the device receives a signal which contains location related information through wireless technologies. Then, a gaze sensor is activated and begins to sense the gaze direction of a user. The gaze sensor may be arranged always on if power conservation is not an issue and the user consents. In Step 114, the gaze sensor detects whether the user looks at the device. If the user looks elsewhere, the device may remain its standby state in Step 116. When the user ends the standby state later on, a temporary icon may appear on screen. The icon may represent information related to the location. Once the icon is tapped or clicked, location related info may be presented. A temporary icon may also be generated on screen for later use when a user is busy engaging with an app at the moment of receiving location related information. Such icon provides another opportunity to present temporarily stored location related contents. Back to the figure, if it is detected that the user looks at the device for a given period of time, the device may start to detect its orientation using a magnetometer component like sensor 22 of FIG. 1, as shown in Step 118. In the meantime, the device may acquire its position status, i.e., its location. Location data may be obtained via the device's own sensor or an outside sensing system. Once info of location and orientation is known, the device may start presentation of related information in Step 120. The related information is of info associated with the pointing direction of the device. For instance, with the knowledge of location and orientation and certain algorithm, a device may provide a list of businesses which are located between its place and somewhere far away along its pointing direction. The list of businesses may be in a text file or shown on a map segment. A map segment is part of a map with an elongated shape along a device pointing direction. A map segment may be obtained by cutting off some parts of a map and leaving only an elongated segment. Thus a pointing act may be used as a sorting tool, and a device may be designed to show information related to or around a pointing direction only. Besides businesses and organizational entities, pointing direction of device may also be used to get info of products. For instance, a user may point a device at one section of a store to get prearranged info of that area, such as coupons and items on sale in that direction.

A device may be in a horizontal position, or vertical position. Take smartphone for instance. If a phone is in horizontal position, with its display screen being horizontal and parallel to the ground, a pointing direction is what its front end points outwards in a horizontal plane. For a phone in vertical position, a pointing direction is what its back points at or its camera points at, which is the opposite direction of what its screen faces.

As orientation data may be obtained fast through an electronic compass, a pointing act may lead to real-time info scanning. In Step 122, device orientation is measured again. If there is no change, contents on display may remain in Step 124. If there is a change, meaning the device is rotated to point at a new direction, another set of contents may be presented in response in Step 126. For example, when a user rotates a smartphone horizontally along a vertical axis, it may work like scanning with a probing beam. It may be designed such that during scanning, only information related to a business which is straight ahead will show up on screen. Thus a user may slowly rotate a device, like a smartphone, to view info at each direction, or point a device at a selected business to access info of that business directly.

FIG. 4 uses graphic diagrams to show another embodiment of presenting location related information. Again, a smartphone is used in a retail setting. It starts with Step 1 when a positioning sensor finds a smartphone 38 at store A. The phone is in standby mode and has a dark screen. A service facility sends the phone a signal, and the phone receives location related information. Unlike the previous embodiment, gaze sensor of the device is not triggered by the location-based signal, but by user's physical act like shaking or tapping the device. In Step 2, the user shakes phone 38, which is picked up by the phone immediately, e.g., within seconds. Then the control system of phone 38, like processor 14 of FIG. 1, sends a signal to the gaze sensor. The gaze sensor starts sensing the user to determine whether he or she looks at the phone screen. If it is detected that user's eye 36 is on the phone screen for a predetermined period of time in Step 3, the device may begin presenting store advertisements and coupons in Step 4.

In above discussions, a user needs to do two things, shaking a phone lightly and watching its screen briefly, and then certain info will be displayed. The scheme brings several merits. A user may have more control over what time to show location related information. It may reduce chances of showing unwanted info by an accidental gaze at a device. In addition, as a shaking act reflects user's desire for certain content, it may help satisfy a user and help content owner like merchants in the meantime.

CONCLUSION, RAMIFICATIONS, AND SCOPE

Thus it can be seen that systems and methods are introduced to present location related information.

The improved method and system have the following features and advantages:
(1). Location related info may be brought out by simply gazing at a screen;
(2). Gaze sensor of a device may be turned on by a location-based signal or shaking act of a user;
(3). Information may be sorted and presented by the pointing direction of a device.

Although the description above contains many specificities, these should not be construed as limiting the scope of the invention but as merely providing illustrations of some of the presently preferred embodiments. Numerous modifications will be obvious to those skilled in the art.
Ramifications:

Ambient light sensor may be added to a device which may be used to sense ambient light intensity to determine whether the device is in a pocket or bag. If a device is not pulled out, act of shaking, tapping or knocking may be ignored in applications discussed in the above.

Furthermore, a device may be equipped with facial recognition system. The system may at least recognize a device owner, which may protect user privacy by not following other people's instructions. The system may make use of eye-tracking camera and employ facial sensing algorithm to identify a user.

In several examples in the above, shaking is used to illustrate various embodiments. It is noted that other forms of user input, such as rotating, tilting, tapping, knocking, or touching may also be employed to perform the same function. Still other methods for a user to interact with a device besides shaking include sliding on a touch screen or touch pad, or opening a lid of a device.

A user may speak to a device to turn on a gaze sensor using voice recognition techniques. For instance, a user may say to a device "Start" and then look at it to invoke a presentation.

If a user's identity is known, info presented may be selected based on not only the location of the user, but also his or her past experience, or based on user's experience only when it is worthwhile to do so. For instance, when a user is travelling, he or she may have more free time, which provides a good chance for presenting certain info, like commercials. Although advertisement presented may be unrelated to a location, since it may fit the interest or need of the user, it may be relevant, and thus effective. Thus, contents presented on a device after the device waked up from a standby state may be location related or arranged at a remote or nearby facility according to a user's records and analysis on the user.

In addition, it may be arranged such that a user may decide what to present on screen. For instance, a user may choose a program for update on news, instant messages, or a social networking group. When there isn't any suitable location related info or other prearranged info from a service, a device may display contents preselected by a user after the device received a signal and appropriate user input. Options may also be configured such that a user may select either to present location related info prepared by a service or present certain info or program prearranged by a user. In practice, buttons "Location-Related Info" and "Self-Selection" may be configured on screen during a presentation period. The buttons may correspond to presentation of location-based info and self-selected info respectively. A user may switch between showing different information by tapping or clicking on the buttons.

Thus, a gazing act may be used to display info which is related to a user's location, records, or self-selection. It is noted that info on display or to be displayed may be any which is arranged by a system, a service, or a user, or may be any which is not related to contents shown on screen before a device got into a standby mode. In other words, it may be arranged such that a gazing act or shaking plus gazing act causes presentation of contents which are specifically arranged and are unrelated to information presented before standby state.

The schemes illustrated in FIGS. 2, 3, and 4 may be combined in many ways. For example, sorting info by pointing function may be applied to all cases. On-screen buttons may be arranged for turning on and off the sorting function. So a user may choose options to turn on or off sorting mode any time.

For convenience and better user experience, after a user arrives at a place and user's device receives location related data, the device may beep to signal that some info is available to watch. Meanwhile, if the device is standby, a small window may appear to post a short notice. Thus, a user may easily know there is something available and then may gaze at the screen or notice window to invoke a presentation or shake the device and then gaze at it to cause info presentation.

Lastly, for a qualified gaze or look at a display, a user's eye may also fall on things located outside of the display but close to its edge, instead of areas on display only. The reason is that, when a user looks at objects close to a display, contents shown on it may also reach the user's eye, thus providing a viewing opportunity anyway. And hopefully, the user may turn his or her sight a bit to get a better reception of the contents. Moreover in many cases, instead of a display of a device, it may be good enough to qualify as a gaze at a display if a user just looks at a direction toward the device, because it means a user may have intention to watch a presentation on it, and the user may have a good chance to notice contents displayed on the device anyway. In cases of smartphone and tablet computer, gazing at a device is almost equivalent to gazing at a display, because for these devices, a display may cover the whole area of one side.

Therefore the scope of the invention should be determined by the appended claims and their legal equivalents, rather than by the examples given.

The invention claimed is:
1. A method performed for presenting information on a display of an electronic device in a standby state, comprising:
1) receiving a location related message transmitted by a system, said location related message generated at a remote or nearby facility;
2) activating a sensor of gaze detection after receiving said location related message;
3) sensing a user and determining whether said user gazes at a direction toward said electronic device;
4) measuring a gazing time period during which said user gazes at a direction toward said electronic device;
5) monitoring whether said gazing time period exceeds a predetermined value; and
6) presenting a plurality of contents using said display when said gazing time period exceeds said predeter- mined value, said plurality of contents arranged unrelated to information presented before said standby state.

2. The method according to claim 1, further including detecting orientation of said electronic device and presenting information according to orientation data.

3. The method according to claim 1, wherein said plurality of contents is arranged location related.

4. The method according to claim 1, further including displaying a graphic object on said display when said gazing time period is below said predetermined value, said graphic object arranged for presentation of said plurality of contents.

5. The method according to claim 1, wherein said plurality of contents includes sponsored information.

6. The method according to claim 1, further including sensing vocal commands of said user.

7. The method according to claim 1, further including presenting information other than said plurality of contents when change of orientation of said electronic device is detected.

8. A method performed for presenting information on a display of an electronic device in a standby state, comprising:
1) receiving a location related message transmitted by a system, said location related message generated at a remote or nearby facility;
2) detecting a user input generated by a user involving physical movement of said electronic device;
3) determining whether said user input matches a predetermined profile;
4) activating a sensor of gaze detection after determining that said user input matches said predetermined profile;
5) sensing said user and determining whether said user gazes at a direction toward said electronic device;
6) measuring a gazing time period during which said user gazes at a direction toward said electronic device;
7) monitoring whether said gazing time period exceeds a predetermined value; and
8) presenting a plurality of contents using said display when said gazing time period exceeds said predetermined value, said plurality of contents arranged unrelated to information presented before said standby state.

9. The method according to claim 8, further including obtaining orientation data of said electronic device and presenting information according to said orientation data.

10. The method according to claim 8, further including generating an audible signal or visible notice after receiving said location related message.

11. The method according to claim 8, further including displaying a graphic object on said display when said gazing time period is below said predetermined value, said graphic object arranged for presentation of said plurality of contents.

12. The method according to claim 8, wherein said plurality of contents includes sponsored information.

13. The method according to claim 8, further including sensing vocal commands of said user.

14. The method according to claim 8, wherein said plurality of contents is arranged location related.

15. A method performed for presenting information on a display of an electronic device in a standby state, comprising:
1) receiving a location related message transmitted by a system, said location related message generated at a remote or nearby facility;
2) detecting physical movement of said electronic device;
3) determining whether said physical movement matches a predetermined profile;
4) activating a sensor of gaze detection after determining that said physical movement matches said predetermined profile;
5) sensing a user and determining whether said user gazes at a direction toward said electronic device;
6) measuring a gazing time period during which said user gazes at a direction toward said electronic device;
7) monitoring whether said gazing time period exceeds a predetermined value; and
8) presenting a plurality of contents using said display when said gazing time period exceeds said predetermined value, said plurality of contents arranged unrelated to information presented before said standby state.

16. The method according to claim 15, further including obtaining orientation data of said electronic device and presenting information according to said orientation data.

17. The method according to claim 15, further including generating an audible signal or visible notice after receiving said location related message.

18. The method according to claim 15, further including displaying a graphic object on said display when said gazing time period is below said predetermined value, said graphic object arranged for presentation of said plurality of contents.

19. The method according to claim 15, further including sensing vocal commands of said user.

20. The method according to claim 15, wherein said plurality of contents is arranged location related.

* * * * *